United States Patent
Breytman et al.

(10) Patent No.: US 7,025,273 B2
(45) Date of Patent: Apr. 11, 2006

(54) MINIATURE AUTO FOCUS VOICE COIL ACTUATOR SYSTEM

(75) Inventors: Alex Breytman, Bellmore, NY (US); Mark Krichever, Hauppauge, NY (US); Bradley S. Carlson, Northport, NY (US); David Tsi Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/425,344

(22) Filed: Apr. 29, 2003

(65) Prior Publication Data

US 2004/0118927 A1  Jun. 24, 2004

Related U.S. Application Data

(60) Provisional application No. 60/434,519, filed on Dec. 18, 2002.

(51) Int. Cl.
*G02B 26/00* (2006.01)
*G06K 7/10* (2006.01)

(52) U.S. Cl. ............................. 235/462.37; 235/462.23

(58) Field of Classification Search ................ 359/210; 235/25, 462.37, 462.23
See application file for complete search history.

(56) References Cited

U.S. PATENT DOCUMENTS

| | | | |
|---|---|---|---|
| 3,812,459 A | 5/1974 | MacNeill et al. | |
| 4,251,798 A | 2/1981 | Swartz et al. | |
| 4,877,949 A | 10/1989 | Danielson et al. | |
| 5,122,644 A * | 6/1992 | Hasegawa et al. | 235/462.26 |
| 5,192,856 A | 3/1993 | Schaham | |
| 5,295,031 A * | 3/1994 | Wasson | 360/264.9 |
| 5,308,966 A | 5/1994 | Danielson et al. | |
| 5,412,205 A * | 5/1995 | McVicar et al. | 250/234 |
| 5,414,251 A | 5/1995 | Durbin | |
| 5,561,283 A | 10/1996 | Dvorkis et al. | |
| 5,576,529 A | 11/1996 | Koenck et al. | |
| 5,630,001 A * | 5/1997 | Jachimowicz et al. | 385/89 |
| 5,635,697 A | 6/1997 | Shellhammer et al. | |
| 5,640,001 A | 6/1997 | Danielson et al. | |
| 5,668,362 A * | 9/1997 | Plesko | 235/462.36 |
| 5,703,349 A | 12/1997 | Meyerson et al. | |
| 5,710,417 A | 1/1998 | Joseph et al. | |
| 5,796,089 A | 8/1998 | Marom | |
| 5,798,515 A | 8/1998 | Li et al. | |
| 5,821,522 A | 10/1998 | Li et al. | |
| 5,837,987 A | 11/1998 | Koenck et al. | |
| 5,920,060 A | 7/1999 | Marom | |
| 6,098,877 A * | 8/2000 | Barkan et al. | 235/25 |
| 6,123,264 A | 9/2000 | Li et al. | |
| 6,138,915 A | 10/2000 | Danielson et al. | |
| 6,336,587 B1 | 1/2002 | He et al. | |
| 6,340,114 B1 | 1/2002 | Correa et al. | |
| 6,412,698 B1 * | 7/2002 | Bontly | 235/462.45 |
| 6,628,445 B1 * | 9/2003 | Chaleff et al. | 359/210 |

* cited by examiner

*Primary Examiner*—Daniel Stcyr
*Assistant Examiner*—Lisa M. Caputo
(74) *Attorney, Agent, or Firm*—Carter, DeLuca, Farrell & Schmidt, LLP (57) ABSTRACT

Actuator systems are provided for automatically focusing an optical image reader. Techniques are also provided which are applicable to the design of imaging engines and imaging lens systems associated with image readers of various types. More specifically, the present invention relates to lens guidance assemblies and actuator systems for automatically focusing an objective lens associated with an imaging system of an optical image reader. The optical image reader is preferably an optical code image reader for imaging optical codes, such as bar codes.

26 Claims, 6 Drawing Sheets

MINIATURE AUTO FOCUS VOICE COIL ACTUATOR SYSTEM

PRIORITY

This application claims priority to a U.S. Provisional Application filed on Dec. 18, 2002 and assigned U.S. Provisional Application Ser. No. 60/434,519, the contents of which are incorporated herein by reference.

BACKGROUND OF THE INVENTION

1. Field of the Invention

This invention relates to imaging in optical reading devices, and, more particularly, to actuator systems to automatically focus a target image in an optical reading device. Aspects of the invention are particularly useful in solid state, area image sensor based, handheld image readers which are positioned at variable orientations and distances with respect to a target image.

2. Description of the Related Art

Optical codes are patterns made up of image areas having different light reflective or light emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type. Optical code readers are used in both fixed and portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference. Another conventional optical code is known as "MaxiCode." It consists of a central finder pattern or bull's eye center and a grid of hexagons surrounding the central finder. It should be noted that the aspects of the invention disclosed in this patent application are applicable to optical code readers, in general, without regard to the particular type of optical codes which they are adapted to read. The invention described herein is also applicable to image recognition and/or analysis devices.

Most conventional scanning systems generate one or more beams of laser light which reflects off a barcode symbol and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two dimensional barcodes is disclosed in U.S. Pat. No. 5,561,283, also assigned to Symbol Technologies, Inc.

Barcodes can also be read employing imaging devices. For example an image sensor may be employed which has a two dimensional array of cells or photo sensors which correspond to image elements or pixels in a field of view of the device. Such an image sensor may be a two dimensional or area charge coupled device (CCD) and associated circuits for producing electronic signals corresponding to a two-dimensional array of pixel information for a field of view.

Many scanners in use today employ a scanning laser beam. Some such systems are deployed in handheld units which may be manually pointed at the target. Often an individual scanner is a component of a much larger system including other scanners, computers, cabling, data terminals, etc. Such systems are frequently designed and constructed on the basis of mechanical and optical specifications for the scanning engine, sometimes called "form factors". One such form factor is the SE1200 form factor employed by Symbol Technologies, Inc.

Since current form factors specify scanning engines with smaller dimensions, there is a need to provide a compact imaging engine which can be substituted for conventional laser line scanning engines in currently designed and currently deployed optical code reader systems.

There is another need to provide an imaging engine which can be substituted for form factor scanning engines in currently designed and currently deployed optical code reading systems to increase the reliability, versatility and target working range of such systems.

It is known in the art to use a CCD photo detector and objective lens assembly in an optical code reader. In the past, such systems have employed complex objective lens assemblies originally designed for use in relatively expensive video imaging systems. Such lens assemblies typically employ multiple, large diameter, aspheric lens elements. Use of aspheric lens elements and a CCD photo detector in a code reader is illustrated in U.S. Pat. No. 5,703,349. Aspheric lens systems are relatively costly and difficult to build. They also have a single sharp focus and a limited depth of field, which along with conventional aiming, illumination and signal processing and decoding algorithms, limits the versatility and working range of the system.

Symbol Technologies, Inc. has developed bi-stable high speed zone collection systems for barcode scanners. These systems which employ lens structures moveable into the input optical path of the scanner (drop-in optics) are disclosed in U.S. Pat. Nos. 5,798,515 and 5,821,522.

Symbol Technologies, Inc. has also developed an easily constructed and inexpensive objective lens assembly for an imaging optical code reader. This assembly is disclosed in U.S. Pat. No. 6,340,114 B1, the contents of which are incorporated herein by reference. This patent also discloses an optical code reader which can be used to read codes at a wide range of distances. Additionally, this patent also discloses an imaging optical code reader with selectable fields of view and working depths of view appropriate to the signal processing and decoding capabilities of the reader.

However, notwithstanding the advancements made in the art, a need still exists for a system which will be small enough to comply with the most recent form factor specifications while offering the same or higher degree of versatility that may be found in existing systems.

SUMMARY OF THE INVENTION

Thus, to solve the problems in the art, the present invention relates to actuator systems for automatically focusing an optical image reader. Techniques are disclosed which are applicable to the design of imaging engines and imaging lens systems associated with image readers of various types. More specifically, the present invention relates to lens guidance assemblies and actuator systems for automatically focusing an objective lens associated with an imaging system.

It is an object of the present invention to provide a compact imaging engine which can be substituted for conventional laser line scanning engines in currently designed and currently deployed optical code reader systems.

It is another object of the present invention to provide an imaging engine which can be substituted for form factor scanning engines in currently designed and currently deployed optical code reading systems to increase the reliability, versatility and target working range of such systems.

It is another object of the present invention to provide an easily constructed and inexpensive moveable objective lens assembly for auto focusing an imaging optical code reader.

It is another object of the present invention to provide a lens guidance assembly for guiding a moveable objective lens assembly for auto focusing an imaging optical code reader.

It is another object of the present invention to provide several actuator assembly embodiments for moving an objective lens assembly along a lens guidance assembly for auto focusing an imaging optical code reader.

It is another object of the present invention to provide an imaging optical code reader having an imaging engine equipped with an objective lens assembly capable of being moved along a lens guidance assembly for auto focusing the imaging optical code reader.

It is another object of the present invention to provide a moveable objective lens assembly for moving along a lens guidance assembly in accordance with a determined focus quality of the lens assembly for automatically adjusting the focus quality of an imaging optical code reader.

Some or all of the objects previously described may be achieved in a single optical code reading engine or system. With the addition of appropriate control circuitry and data processing software, a system may be constructed serving the object of producing a compact, inexpensively fabricated imaging engine which may be substituted for existing line scan engines. The engine may be adapted for use in many different environments, with various optical fields and focal distances, for reading various codes of different size. The system may also be used for image recognition or analysis, including acquisition of data concerning the target and its environment.

BRIEF DESCRIPTION OF THE DRAWINGS

For a better understanding of the invention, reference is made to the following description of preferred embodiments thereof, and to the accompanying drawings, wherein.

DETAILED DESCRIPTION OF PREFERRED EMBODIMENTS

Figure 1:
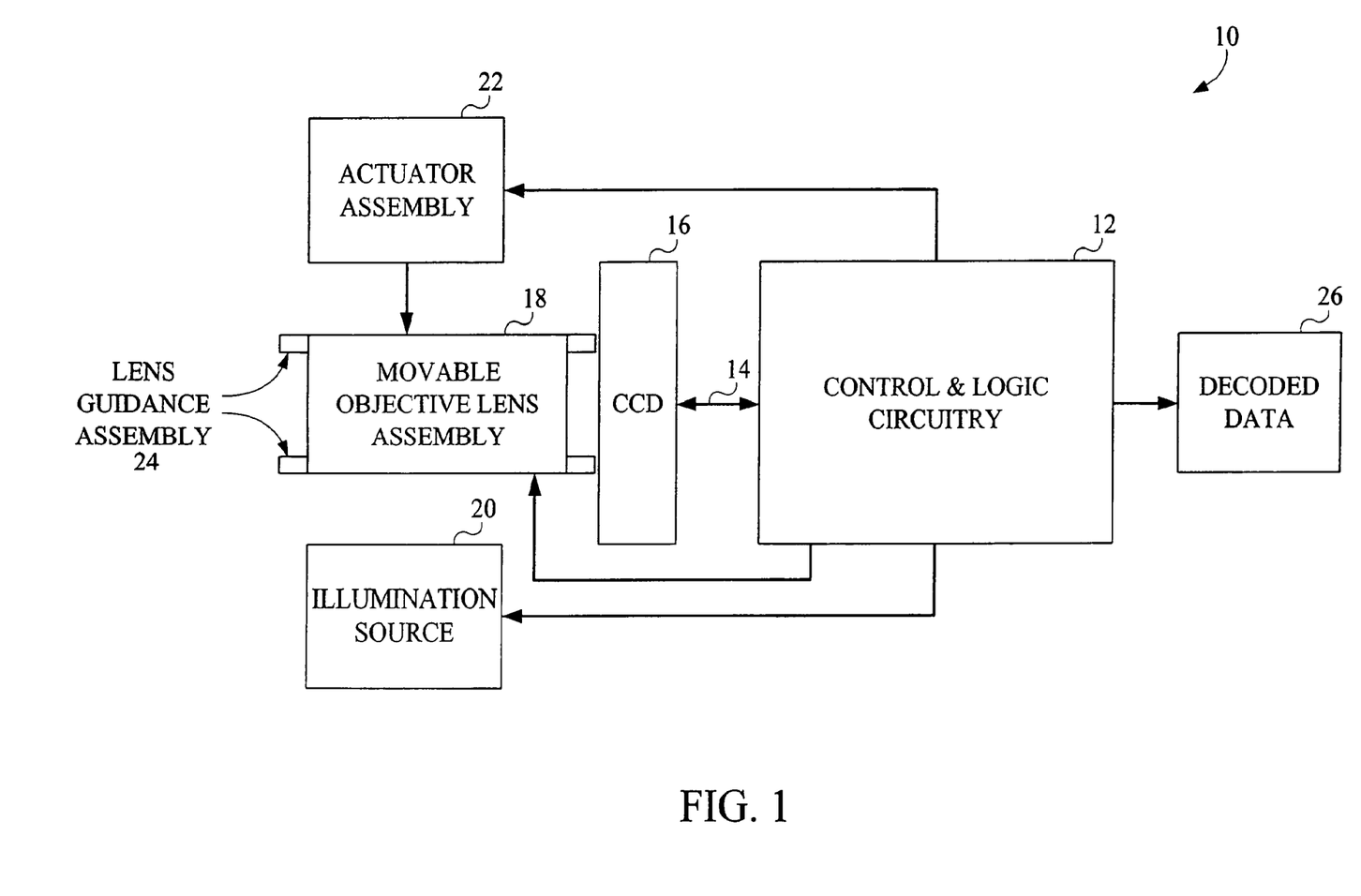
FIG. 1 is a simplified functional block diagram of a preferred embodiment of an imaging engine of the present invention.

It is to be appreciated that the present invention is applicable to any type of identification device. For illustrative purposes, a detailed description of an imaging device is provided herein. Referring now in specific detail to the drawings in which like reference numerals identify similar or identical elements throughout the several views, and initially to FIG. 1, one embodiment of an imaging engine 10 constructed in accordance with the present disclosure is shown. More specifically, FIG. 1 is a functional block diagram of a preferred embodiment of the imaging engine 10 of the present invention illustrating the arrangement of certain components of the imaging engine. The electronic hardware comprising the imaging subsystem and decoding subsystem is represented generally by a block 12, labeled "control and logic circuitry." A double headed arrow 14 illustrates the transmission of signals between an image sensor 16 and the control and logic circuitry 12. Image sensor 16 receives optical image information through an objective lens assembly 18. As further illustrated in FIG. 1, an illumination source 20 and actuator assembly 22 may be controlled by signals provided by the control and logic circuitry 12.

The imaging engine can be decoded (as shown in FIG. 1) or undecoded producing a raw video stream. In the undecoded case the engine can be sold as a component to be integrated into a device that performs the decoding.

In a preferred embodiment, the image sensor is a charge coupled device (CCD). However, it is to be understood that other area image sensors may be used for the intended purpose, such as CMOS, CMD (charge modulated device) or CID (charge injection device) sensors. Preferred embodiments of the present invention may include circuitry and/or software for processing and decoding image data received from the image sensor 16. An image sensor produces electronic signals typically corresponding to a two-dimensional array of pixel information for a target image. This data is analyzed by circuitry/software based systems to determine black and white threshold information. The pixel data is divided into sub-images, for example, 32×32 pixel sub-images. These sub-images are analyzed for properties known to be associated with various types of optical codes and known to distinguish a particular code from other codes and from environmental (non-code) images.

A lens assembly 18 is provided having at least one lens for focusing light incident on the image sensor 16. The lens assembly 18 is moveable along a lens guidance assembly 24 for changing the back focal length. The objective lens assembly 18 suitable for use in a preferred embodiment of an imaging engine of the present invention may include a cylindrical shaped housing which contains at least one lens element. The lens element may be snap fit in the cylindrical shaped housing to maintain the lens in position on a common optical axis.

In preferred embodiments, the lens assembly 18 is automatically moved between a plurality of positions for automatically focusing an object to be imaged, such as a barcode. Lens guidance assembly 24 guides and supports the lens assembly 18 as it moves to automatically focus the object prior to imaging the object.

Actuator assembly 22 preferably imparts either proximal or distal motion to lens assembly 18 for moving the lens assembly either away from the object or towards the object, respectively. Hence, the amount of movement of the lens assembly 18 depends on the amount of time the actuator assembly 22 is actuated multiplied by the distance the lens assembly 18 moves over a given unit of time (velocity).

Preferably, the actuator assembly 22 is actuated after determining the distance between the imaging apparatus and the object to be imaged. A distance determining method which can be used to determine the distance between the imaging apparatus of the present invention and the object is disclosed in U.S. Pat. No. 6,340,114 B1 which is assigned to Symbol Technologies, Inc. The method involves using an aiming system of the imaging optical code reader to measure the distance to a target image. Other distance determining methods may be used for determining the distance between the imaging apparatus and the object to be imaged such as, for example, the methods disclosed in copending U.S. patent application Ser. No. 10/425,499, filed Apr. 29, 2003, which is incorporated by reference herein.

The determined distance to the object is then correlated by the processing system to a specific or approximate position of the lens guidance assembly 24 with respect to a fixed reference point (e.g., a specific point of the lens guidance assembly, such as the central point).

The processing system in communication with the imaging apparatus then determines the amount of distance the lens assembly needs to be moved to be at the specific or approximate position of the lens guidance assembly with respect to the fixed, reference point. To perform this computation, the processing system takes into consideration the last stored position of the reference point of the lens assembly 18 with respect to the fixed, reference point. The last stored position of the reference point of the lens assembly 18, without taking into consideration the occasional need to calibrate the imaging apparatus by manually or automatically setting the current position of the lens assembly at a known position with respect to the fixed, reference point, equates to the current position of the reference point of the lens assembly 18 with respect to the fixed, reference point.

The last "recorded" or current position is determined by the processing system by continuously calculating the amount of distance the reference point of the lens assembly 18 moves with respect to the fixed, reference point. For example, after an initial manufacturing setting or calibration of the imaging apparatus, the reference point of the lens assembly 18 is located on the same plane as the fixed, reference point, or at a known distance from the fixed, reference point, e.g., the furthermost possible position from the fixed, reference point.

Thereafter, during operation of the imaging apparatus, the lens assembly 18 is moved along the lens guidance assembly 24 to auto focus the imaging apparatus. The distance moved by the lens assembly either forwards or backwards along an axis during each actuation of the actuator assembly 22 is added or subtracted, respectively, by the processing system to a previously recorded number. For example, if an initial position of the lens assembly 18 is identified as position zero (preferably this initial position equates to the reference point of the lens assembly being located on the same plane as the fixed, reference point) and after actuating the actuation assembly for a predetermined time period for moving the lens assembly +0.11 mm (i.e., 0.11 mm towards the object to be imaged) with respect to the fixed, reference point, the processing system adds zero and +0.11 to determine the new position of the reference point of the lens assembly as being +0.11 mm from the fixed, reference point. This position is stored by the processing system and it is the last stored position of the reference point of the lens assembly 18 or the current position of the reference point as mentioned above. The predetermined actuation time period of the actuator assembly is determined by the processing system according to how much the lens assembly needs to be moved to auto focus the object based on the determined distance between the imaging apparatus and the object.

At the current position of the lens assembly 18, the object is then imaged by the imaging apparatus and a signal indicative of the imaged object is transmitted to an image processing system capable of executing a series of programmable instructions for identifying the object imaged and/or obtaining information encoded by the imaged object, such as information encoded by a barcode. The image processing system is preferably integrated with the processing system.

After the imaging apparatus is auto focused and the object is imaged, the above-described auto focus imaging process is repeated for a subsequent object to be imaged. That is, upon the initiation of the auto focus imaging process by a user depressing a trigger of the imaging optical code reader or performing some other action, the distance between the imaging apparatus and the object to be imaged is determined by the aiming system in conjunction with the processing system. The processing system then determines the amount of distance the lens assembly 18 is to be moved, either towards or away from the object, from the current position, and accordingly the actuation time period of the actuator assembly. The actuator assembly is then actuated for an amount of time equal to the actuation time period and the lens assembly 18 is moved by an amount equal to the determined amount for auto focusing the object to be imaged. The object is then imaged.

With continued reference to the previous example, the new position of the reference point of the lens assembly 18 is then stored by the processing system as being +0.11 mm from the fixed, reference point plus the newly moved distance. If the newly moved distance is −0.73 mm (i.e., the lens assembly moved 0.73 mm away from the object to be imaged), then the current position of the reference point of the lens assembly is determined to be −0.62 mm from the fixed, reference point. The newly moved distance is computed by determining that the reference point of the lens assembly 18 must be located at −0.62 mm from the fixed, reference point (i.e., 0.62 mm away from the fixed, reference point in the direction opposite from the location of the object) to maximally auto focus the object to be imaged based on the determined distance between the imaging apparatus and the object.

Further still, the focus quality determination method can be used to auto-discriminate between barcodes and other objects by analyzing the pixel data. Hence, a signal indicating the type of object and other information describing the object can be provided to the image processing system before a full image of the object has been captured, or, in the case where the object is constantly imaged using all of the pixels but only data representative of only a few of the pixels is analyzed, the last captured image or accepted image is provided for image processing.

Additionally, by knowing the type of object, the threshold focus quality range or image resolution can be adjusted "on-the-fly." For example, if the object being imaged is determined to be a bar code, the threshold focus quality can be adjusted to be within a range indicative of low to medium image resolution. If the object being imaged is determined to be a fine-printed number, the threshold focus quality can be adjusted to be within a range indicative of medium to high image resolution. It is contemplated that a numbering system can also be used to quantify the focus quality. For example, the range of one to ten can be used, where the number one is equivalent to extremely poor focus quality or image resolution and the number ten is equivalent to extremely high focus quality or image resolution.

The above-described imaging apparatus may constitute part of an imaging engine which also includes a power supply, decoding circuitry and video controller circuitry. In preferred embodiments, the imaging engine is less than two cubic inches in volume and is dimensioned to replace a moving laser beam imaging engine in a handheld barcode scanner, such as SE900 and SE1200 form factor imaging engines. Such an imaging engine maybe designed to read a variety of types of optical codes including high and low density barcodes at a working range of between 1½ and 18 inches, or more.

More specifically, as shown in FIG. 1, actuator assembly 22 is preferably configured to receive a control signal from the control and logic circuitry 12 and cause movement of objective lens assembly 18. Movement of the objective lens assembly will change the quality of focus of an image at the image sensor 16. More specifically, in operation, the control and logic circuitry 12 may direct the actuator assembly 22 to cause the objective lens assembly 18 to move between a relatively short focal distance and a relatively long focal distance, thereby permitting the imaging engine to be used to read various sized images located at different distances from the imaging engine, while the image remains in focus.

The illumination source 20 may consist of an illumination printed circuit board and a lenslet plate. The illumination printed circuit board may include a plurality of light emitting diodes. In a preferred embodiment, twenty 660 nm laser diodes are arranged on the illuminator board. In an alternative embodiment, laser diodes producing a higher or lower wavelength light may be employed. In either case, the laser diodes are arranged in such a way that the target area is evenly illuminated. In systems where multiple fields of view and multiple focal lengths are selectable in the imaging engine, the illumination system may provide different fields of illumination. Light emanating from the light emitting diodes is projected through apertures or lenslets in a front plate of the imaging engine.

The illumination source may produce a relatively broad beam of lower output intensity to illuminate a target barcode relatively close to the imaging optical code reader, and a relatively narrower beam of higher output intensity to illuminate a target barcode relatively far from the reader. A portion of the illumination source for producing the lower output intensity illumination beam may comprise one or more light emitting elements with a wide divergence pattern located relatively near a principle optical axis of the lens assembly. Additional elements may be used to provide a longer range illumination beam of higher output intensity. In a preferred embodiment, this function is performed by light emitting elements with a narrow divergence pattern located relatively farther from a principle optical axis of the imaging engine. These latter elements may be plural light emitting diodes each associated with a focusing lenslet located in a front face of the imaging engine.

In an illumination system using plural light emitting elements, certain intensity variations may occur across the illuminated field. In preferred embodiments of the present invention, image processing circuits and/or software compensates signals from the image sensor for known variations in illumination provided by the illumination source.

Optical image data is obtained and processed by circuitry and software within the image sensor 16. This data may be in the form of electronic signals corresponding to a two-dimensional array of pixel information for a target image. The data may be stored for subsequent processing in the memory of the control and logic circuitry 12. It will be understood that the processing software may have access to stored image data at all levels. At various processing steps, portions of the image data may be called up for further processing or to confirm on-going analyses.

Figure 2:
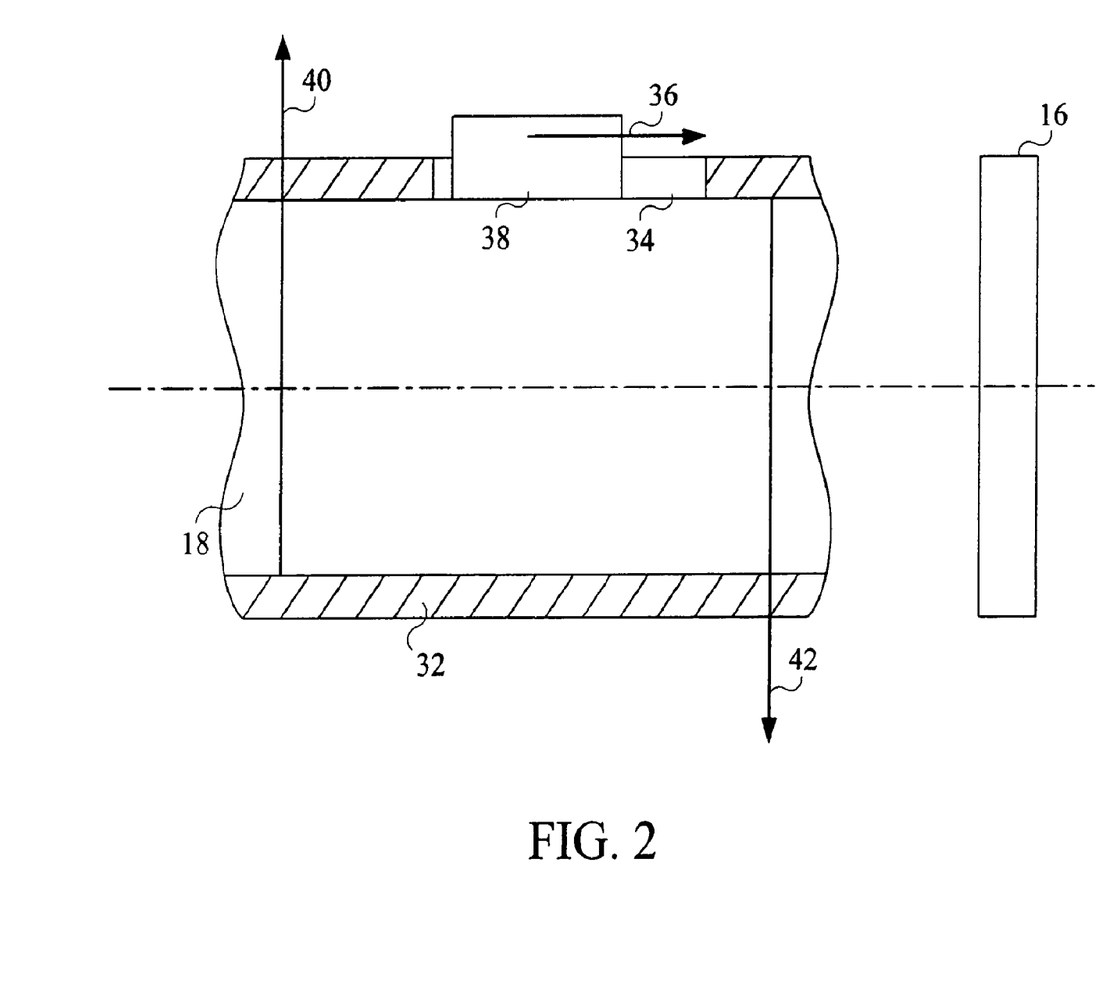
FIG. 2 is a sectional view of a lens guidance assembly made in accordance with a preferred embodiment of the present invention.

Referring now to FIG. 2, one embodiment of a lens guidance assembly is illustrated in cross-section in the form of a sliding bushing 32. Sliding bushing 32 is formed in a cylindrical shape having a substantially circular cross-section. The sliding bushing 32 defines a longitudinal bore therethrough and is dimensioned to accept an objective lens assembly 18 therein. Preferably, the dimensions of the objective lens assembly 18 and the sliding bushing 32 are such that an interference fit is achieved between the outer circumference of the objective lens assembly 18 and the inner circumference of the sliding bushing 32. The interference fit will minimize the chance of misalignment of the lens assembly due to minor disturbing forces. Sliding bushing 32 is preferably formed of a graphite impregnated liquid crystal material. It is also contemplated that sliding bushing 32 may be formed of Teflon or any other material having lubricious properties. Sliding bushing 32 may also be formed with flanges (not shown) on either end, or any other configuration, to match corresponding structure within a housing for the imaging apparatus.

Sliding bushing 32 further defines a longitudinal slot 34 in a portion thereof to facilitate at least a temporary connection with an actuator assembly which will provide the necessary forces to affect movement of the lens assembly 18. That is, to automatically focus the optical image, an external moving force is applied to lens assembly 18. As shown in the embodiment illustrated in FIG. 2, a moving force is applied to lens assembly 18 in the direction indicated by arrow 36, via a tab 38. Tab 38 attaches to lens assembly 18, and extends through slot 34 in sliding bushing 32. Slot 34 has a length dimension which is longer than the length of tab 38 to allow tab 38 and lens assembly 18 to slide within bushing 32 to adjust the focal point at the image sensor 16.

Arrows 40 and 42 represent the direction of the reaction forces which are applied to the bushing 32 as a result of the moving force applied to tab 38. Since the moving force applied to tab 38 creates a moment about the lens assembly 18, reactive force 40 is in the upward direction and reactive force 42 is in the downward direction. Notwithstanding the forces placed on the lens assembly, bushing 32 will keep the lens assembly 18 substantially oriented along the longitudinal optical axis.

Figure 3:
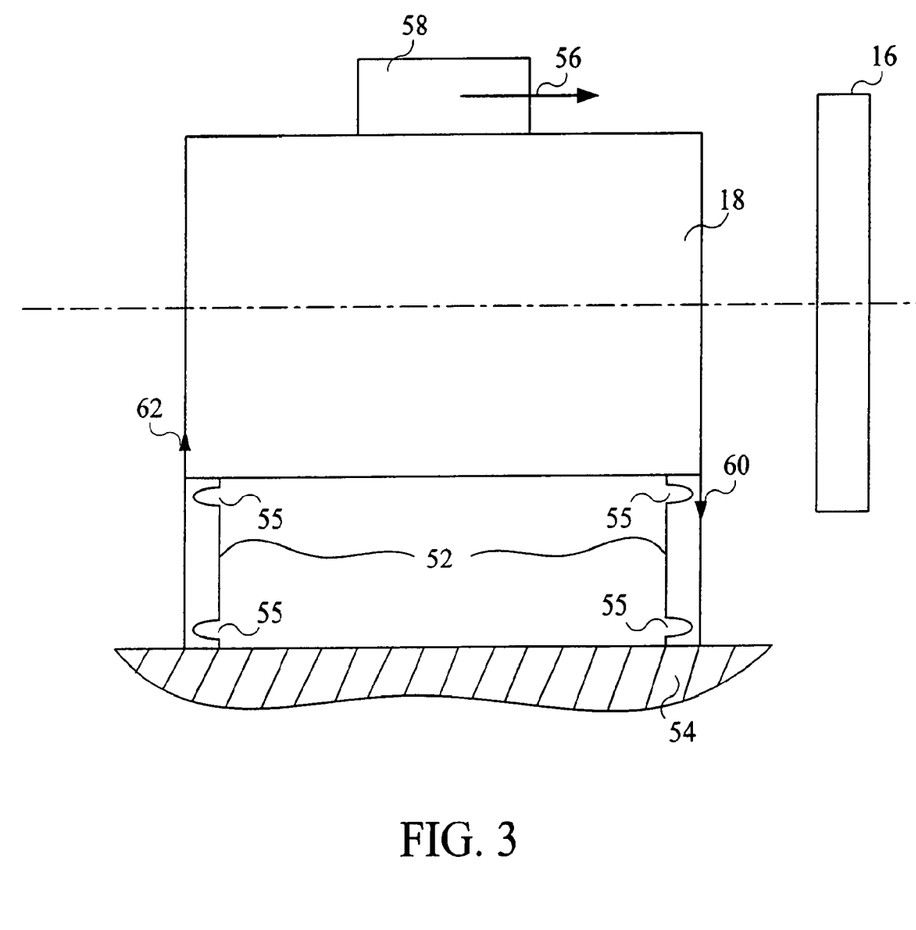
FIG. 3 is a sectional view of a lens guidance assembly made in accordance with another preferred embodiment of the present invention.

Referring now to FIG. 3, another embodiment of a lens guidance assembly is shown. In this embodiment of a lens guidance assembly, the lens guidance assembly is illustrated in the form of a pair of living hinges 52. Living hinges 52 are flexible, resilient members which are connected to a stationary frame 54 at a first end thereof and to the objective lens assembly 18 at a second end thereof. Thus, living hinges 52 provide support for the objective lens assembly 18 while maintaining the flexibility to give objective lens assembly 18 the ability to move in response to external forces applied thereto. Living hinges 52 are substantially rectangular in cross-section and have notches 55 adjacent to each of the first and second ends. The flexibility of the living hinges 52 may be varied by changing the size and/or number of notches 55. The two living hinges 52 illustrated in FIG. 3 may be separate, individual units or the hinges may be connected to each other at one or both of the first and second ends. Living hinges 52 are preferably formed of acetal, but may be formed of other materials having similar properties.

Tab 58 is connected to lens assembly 18 on a first side of tab 58 and to an actuator assembly on a second side of tab 58. As shown in the embodiment illustrated in FIG. 3, to automatically focus an optical image, an external moving force is applied to lens assembly 18, via tab 58, in the direction indicated by arrow 56. Arrows 60 and 62 represent the direction of the reaction forces which are applied to the living hinges 52 as a result of the moving force applied to tab 58. Since the moving force applied to tab 58 creates a moment about the lens assembly, reactive force 62 is in the upward direction and reactive force 60 is in the downward direction. Advantageously, living hinges 52 have low friction and low wear characteristics which give the user the ability to make precise automatic focus adjustments. It is also contemplated that a force may be applied to the lens assembly in a direction which is different than the direction of arrow 56.

Figure 4:
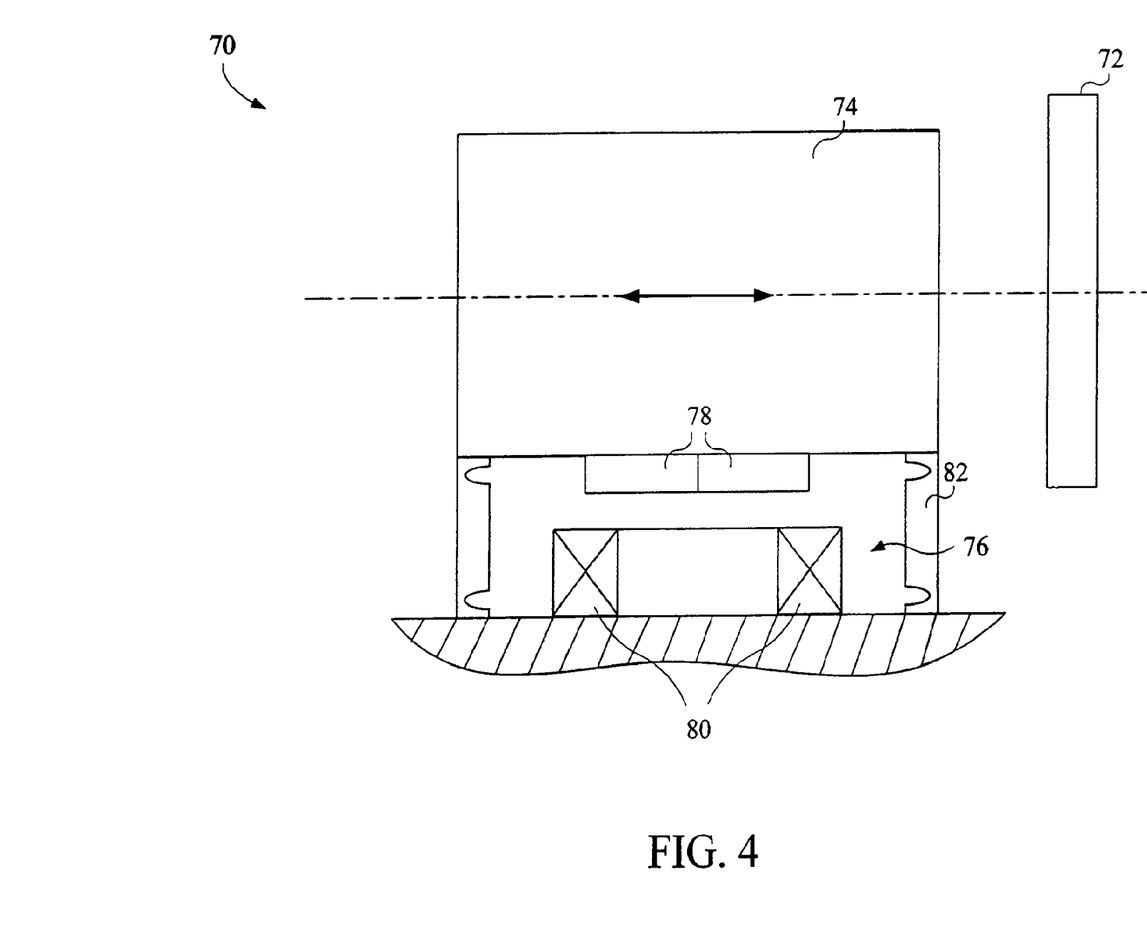
FIG. 4 is a sectional view of an actuator assembly made in accordance with a preferred embodiment of the present invention.

Referring now to FIG. 4, an imaging apparatus 70 is illustrated in accordance with a preferred embodiment of the present invention. Imaging apparatus 70 includes an image sensor 72, a lens assembly 74, and a voice coil assembly 76. Voice coil assembly 76 includes a pair of magnets 78 and a coil 80. As will be described in further detail below, this embodiment relies on movement of the magnets 78 to move lens assembly 74 in a direction which will achieve a desired focus of a target image.

Lens assembly 34 is preferably supported within a lens guide system such as, for example, a sliding bushing or living hinges. The lens guide system 82 illustrated in FIG. 4 corresponds to the living hinges described above with reference to FIG. 3. Accordingly, lens guide system 82 provides the necessary support while remaining flexible enough to permit movement of the lens assembly 74 to facilitate focusing of the optical information passing therethrough.

Lens assembly 74 is preferably supported within a lens guide system such as, for example, a sliding bushing or living hinges. The lens guide system 82 illustrated in FIG. 4 corresponds to the living hinges described above with reference to FIG. 3. Accordingly, lens guide system 82 provides the necessary support while remaining flexible enough to permit movement of the lens assembly 74 to facilitate focusing of the optical information passing therethrough.

In this embodiment, the actuator assembly referred to in FIG. 1 comprises a voice coil assembly 76, as illustrated in FIG. 4. Accordingly, the output signal from the control and logic circuitry varies the flow of current through coil 80. A variation in the current through coil 80 will cause a change in the flux created by coil 80 and resulting electromagnetic force between the coil 80 and magnets 78, thereby resulting in movement of the magnets 78 with respect to coil 80. For example, the variation in the current within coil 80 may cause the magnets 78 to move closer to or further away from coil 80. The magnets 78 may be attached to lens assembly 74 or positioned adjacent thereto such that movement of the magnets will cause movement of the lens assembly 74. Alternatively, lens assembly 74 may have a tab formed thereon or attached thereto, upon which the magnets apply a force to cause movement of the lens assembly.

Figure 5:
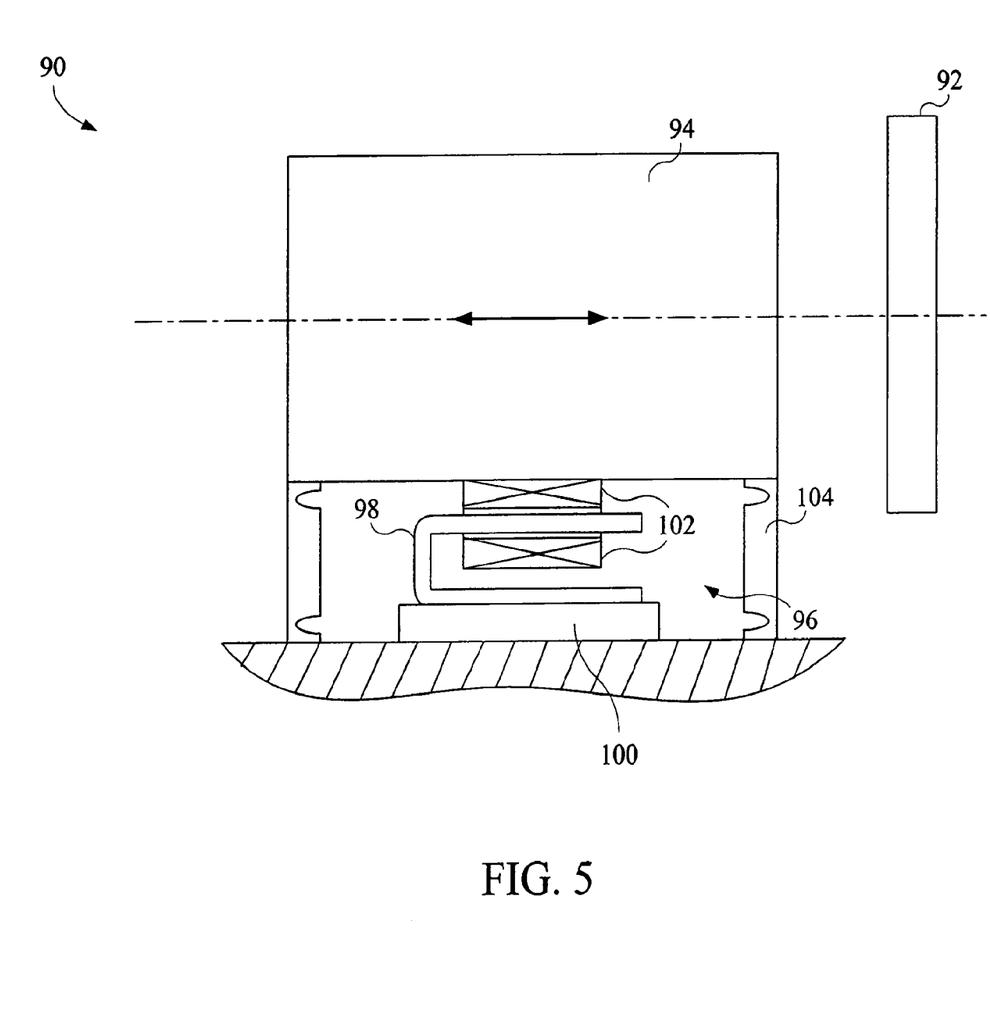
FIG. 5 is a sectional view of an actuator assembly made in accordance with another preferred embodiment of the present invention.

Referring now to FIG. 5, an imaging apparatus 90 is illustrated in accordance with another embodiment of the present invention. Imaging apparatus 90 includes an image sensor 92, a lens assembly 94, and a voice coil assembly 96. The voice coil assembly 96 is comprised of a yoke 98, a magnet 100 and a coil 102. As will be described in further detail below, this embodiment relies on movement of the coil 102 to move lens assembly 94 in a direction which will achieve a desired focus of a target image.

Lens assembly 94 is preferably supported within a lens guide system such as, for example, a sliding bushing or living hinges. The lens guide system 104 illustrated in FIG. 5 corresponds to the living hinges described above with reference to FIG. 3. Accordingly, the living hinges of lens guide system 104 provide the necessary support while remaining flexible enough to permit movement of the lens assembly 94 to facilitate focusing of the optical information passing therethrough.

Lens assembly 94 is configured to focus optical information on the image sensor 92. Image sensor 92 produces electronic signals corresponding to an array of pixel information for the target image. As illustrated in FIG. 1, the electronic signals from image sensor 92 are transmitted to control and logic circuitry. The control and logic circuitry process the signals and provide an output signal to an actuator assembly relative to the focus of the target image. The method for determining whether the target image is in focus and what the corresponding output signal should be is described in further detail in U.S. patent application Ser. No. 10/389,184, which is incorporated by reference herein.

In this embodiment, the actuator assembly referred to in FIG. 1 comprises a voice coil assembly, as illustrated in FIG. 5. Accordingly, the output signal from the control and logic circuitry varies the flow of current through coil 102. A variation in the current through coil 102 will cause a change in the flux created by coil 102 and resulting electromagnetic force between the coil 102 and the yoke 98. Since the yoke 98 is being held stationary by the magnet 100, the coil 102 will move with respect to yoke 98. The coil 102 may be attached to lens assembly 94 or positioned adjacent thereto such that movement of the coil will cause movement of the lens assembly 94.

Figure 6:
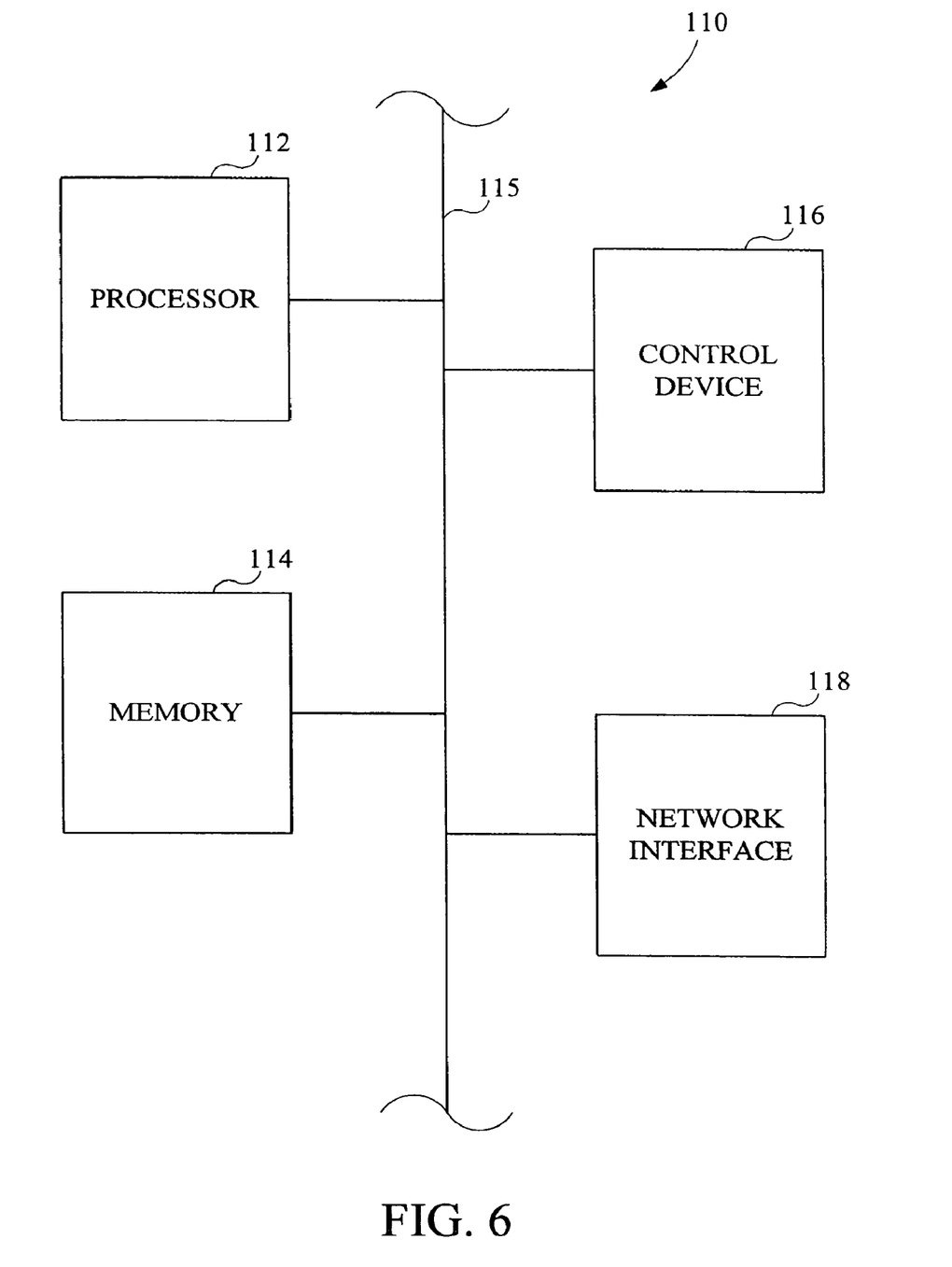
FIG. 6 is a block diagram illustrating a processing device for use in accordance with an embodiment of the present invention.

FIG. 6 shows an example of a processing device 110 that may be used to implement, e.g., a program for determining the distances of the various components described above with reference to FIGS. 1–5. The device 110 includes a processor 112 and a memory 114 which communicate over at least a portion of a set 115 of one or more system buses. Also utilizing at least a portion of the set 115 of system buses are a control device 116 and a network interface device 118. The device 110 may represent, e.g., portions or combinations of the control and logic circuitry 12 or any other type of processing device for use in implementing at least a portion of the process in accordance with the present invention. The elements of the device 110 may correspond to conventional elements of such devices.

For example, the processor 112 may represent a microprocessor, central processing unit (CPU), digital signal processor (DSP), or application-specific integrated circuit (ASIC), as well as portions or combinations of these and other processing devices. The memory 114 is typically an electronic memory, but may comprise or include other types of storage devices, such as disk-based optical or magnetic memory. The control device 116 may be associated with the processor 112. The control device 116 may be further configured to transmit control signals.

The image focusing techniques described herein may be implemented in whole or in part using software stored and executed using the respective memory and processor elements of the device 110. For example, the process for determining the distances of the various components may be implemented at least in part using one or more software programs stored in memory 114 and executed by processor 112. The particular manner in which such software programs may be stored and executed in device elements such as memory 114 and processor 112 is well understood in the art and therefore not described in detail herein.

Although the illustrative embodiments of the present invention have been described herein with reference to the accompanying drawings, it is to be understood that the invention is not limited to those precise embodiments, and that various other changes and modifications may be affected therein by one having ordinary skill in the art without departing from the scope or spirit of the invention. For example, the optics may include first and second objective lenses having two different fields of view. Additionally, although the illustrative embodiments have been described with reference to an imaging device, it is to be appreciated that the term imaging device is intended to encompass any type of identification device. Thus, it is contemplated that the invention may be utilized in association with any type of identification device. Accordingly, various modifications and variations can be made without departing from the spirit or scope of the invention as set forth in the following claims both literally and in equivalents recognized in law.

What is claimed is:

1. An identification apparatus comprising:
    an image sensor for producing electronic signals corresponding to optical information representative of a target image;
    a lens assembly having at least one lens defining an optical path for focusing the target image on the image sensor;
    a voice coil actuator assembly configured to solely move the at least one lens along a longitudinal direction with respect to the optical path and along the optical path; and
    control and logic circuitry for actuating the voice coil actuator for a time interval that corresponds to a determined distance from the identification apparatus to a target being imaged for focusing the target image on the image sensor, wherein the apparatus is configured to be less than two cubic inches in volume.

2. The apparatus as recited in claim 1, further comprising a lens guidance assembly, wherein the lens assembly is moved along the lens guidance assembly to focus the target image on the image sensor.

3. The apparatus as recited in claim 2, wherein the lens guidance assembly comprises a pair of living hinges.

4. The apparatus as recited in claim 2, wherein the lens guidance assembly comprises a cylindrical bushing.

5. The apparatus as recited in claim 1, wherein the image sensor comprises a charge coupled device.

6. The apparatus as recited in claim 1, wherein the voice coil actuator assembly comprises a coil and a magnet adjacent to the coil.

7. The apparatus as recited in claim 6, wherein the voice coil actuator assembly further comprises a yoke positioned at least partially within a void defined by the coil.

8. The apparatus as recited in claim 1, wherein the optical information comprises an array of pixel information.

9. The apparatus as recited in claim 8, wherein the array of pixel information is two-dimensional.

10. The apparatus as recited in claim 1, wherein the voice coil actuator assembly is positioned adjacent to the lens assembly.

11. The apparatus as recited in claim 1, wherein the control and logic circuitry further processes the electronic signals produced by the image sensor.

12. The apparatus as recited in claim 1, wherein the target image is a barcode.

13. The apparatus as recited in claim 1, further comprising an illumination source for illuminating a target area.

14. The apparatus as recited in claim 13, wherein the illumination source comprises a plurality of light emitting diodes.

15. A method of reading an image with an identification apparatus, the method comprising the steps of:
    producing electronic signals in an image sensor, wherein the electronic signals correspond to optical information representative of a target image;
    determining a distance from the identification apparatus to a target being imaged; and
    actuating a voice coil actuator assembly for a time interval that corresponds to the determined distance for moving a lens assembly having at least one lens defining an optical path to a position for focusing the target image on the image sensor, wherein actuation of the voice coil actuator solely moves the at least one lens along a longitudinal direction with respect to the optical path and along the optical path, wherein the apparatus is configured to be less than two cubic inches in volume.

16. The method as recited in claim 15, further comprising the step of transmitting the electronic signals to an image processing system which is configured to execute a series of programmable instructions to identify the target image.

17. A method of focusing an image with an identification apparatus, the method comprising the steps of:
    determining a distance between the identification apparatus and a target image;
    determining a desired position on a lens guidance assembly that is located a distance from a predetermined position on the lens guidance assembly that correlates to the determined distance;
    determining a current position of a lens assembly on the guidance assembly with respect to the predetermined position on the lens guidance assembly;
    determining an amount of distance that the lens assembly needs to be moved to be positioned at the desired position on the lens guidance assembly; and
    actuating an actuator assembly to solely move the lens assembly along a single direction with respect to an optical path defined by the lens assembly, along the optical path and along the lens guidance assembly for an amount of time that corresponds to the distance that the lens assembly needs to be moved to focus the target image on an image sensor, wherein the apparatus is configured to be less than two cubic inches in volume.

18. The method as recited in claim 17, wherein the predetermined position on the lens guidance assembly is a fixed reference position.

19. The method as recited in claim 17, wherein the current position of the lens assembly with respect to the predetermined position on the lens guidance assembly is continuously determined.

20. The method as recited in claim 17, wherein the actuator assembly is a voice coil actuator assembly.

21. An apparatus for processing information for focusing an image with an identification apparatus, the apparatus comprising:
   a memory for storing at least a portion of the information; and
   a processor coupled to the memory and operative to determine a distance between the identification apparatus and a target image; determine a desired position on a lens guidance assembly that is located a distance from a predetermined position on the lens guidance assembly that correlates to the determined distance; determine a current position of a lens assembly on the guidance assembly with respect to the predetermined position of the lens guidance assembly; determine an amount of distance that the lens assembly needs to be moved to be positioned at the desired position on the lens guidance assembly; and generate a control signal to actuate an actuator assembly to solely move the lens assembly along a single direction with respect to an optical path defined by the lens assembly, along the optical path and along the lens guidance assembly for an amount of time that corresponds to the distance that the lens assembly needs to be moved to focus the target image on an image sensor, wherein the apparatus is configured to be less than two cubic inches in volume.

22. An optical code reader defining an optical path and comprising:
   an image sensor for producing electronic signals corresponding to optical information representative of a target image;
   a lens assembly for focusing the target image on the image sensor;
   an actuator assembly configured to move the lens assembly; and
   control and logic circuitry for actuating the actuator for a time interval that corresponds to a determined distance from the identification apparatus to a target being imaged for solely moving the lens assembly along a single direction with respect to the optical path and along the optical path for focusing the target image on the image sensor, wherein the optical code reader is configured to be less than two cubic inches in volume.

23. The optical code reader as recited in claim 22, wherein at least a portion of the electronic signals are digitized and provided as pixel data to the control and logic circuitry, the control and logic circuitry processes at least a portion of the pixel data to determine at least one characteristic of the target being imaged; selecting a threshold focus quality in accordance with the determined at least one characteristic; and determining the time interval in accordance with the selected threshold focus quality.

24. The optical code reader as recited in claim 22, further comprising at least one illumination source; wherein at least a portion of the electronic signals are digitized and provided as pixel data to the control and logic circuitry, the control and logic circuitry processes at least a portion of the pixel data to determine at least one characteristic of the target being imaged; and the control and logic circuitry controls the at least one illumination source in accordance with the determined at least one characteristic.

25. The optical code reader as recited in claim 24, wherein the at least one illumination source includes first and second illumination sources each having different fields of illumination, and wherein the control and logic circuitry actuates a selected one of the first and second illumination sources in accordance with at least one of the determined at least one characteristic and the determined distance.

26. The optical code reader as recited in claim 25, wherein the different fields of illumination differ due to differences associated with the first and second illumination sources including at least one of generation of respective illumination beams having different divergence patterns, generation of respective illumination beams having different illumination intensity and positioning of the first and second illumination sources at different positions relative to a principle optical axis of the lens assembly.

* * * * *